US012346316B2

(12) United States Patent
Aggarwal

(10) Patent No.: US 12,346,316 B2
(45) Date of Patent: Jul. 1, 2025

(54) KNOWLEDGE GRAPH GENERATION FOR DATA WAREHOUSE

(71) Applicant: DataIris Platform, Inc., Los Altos, CA (US)

(72) Inventor: Amit Aggarwal, Los Altos, CA (US)

(73) Assignee: DataIris Platform, Inc., Palo Alto, CA (US)

( * ) Notice: Subject to any disclaimer, the term of this patent is extended or adjusted under 35 U.S.C. 154(b) by 0 days.

(21) Appl. No.: 18/188,059

(22) Filed: Mar. 22, 2023

(65) Prior Publication Data

US 2024/0273092 A1    Aug. 15, 2024

Related U.S. Application Data

(60) Provisional application No. 63/484,302, filed on Feb. 10, 2023.

(51) Int. Cl.
*G06F 16/24* (2019.01)
*G06F 16/22* (2019.01)
*G06F 16/242* (2019.01)
*G06F 16/2452* (2019.01)
*G06F 16/2453* (2019.01)

(52) U.S. Cl.
CPC ........ *G06F 16/243* (2019.01); *G06F 16/2246* (2019.01); *G06F 16/24522* (2019.01); *G06F 16/24539* (2019.01)

(58) Field of Classification Search
CPC ........... G06F 16/24522; G06F 16/2246; G06F 16/24539
See application file for complete search history.

(56) References Cited

U.S. PATENT DOCUMENTS

| 2015/0052175 A1* | 2/2015 | Bornea | G06F 16/211 |
| | | | 707/798 |
| 2015/0120775 A1* | 4/2015 | Shao | G06F 16/2456 |
| | | | 707/769 |
| 2018/0081990 A1* | 3/2018 | Johnson | G06F 16/9024 |
| 2018/0121546 A1* | 5/2018 | Dingwall | H04L 63/10 |
| 2018/0260458 A1* | 9/2018 | Huang | G06F 16/258 |
| 2019/0114369 A1* | 4/2019 | Sloane | G06F 16/2452 |
| 2020/0012741 A1* | 1/2020 | Bracholdt | G06F 16/288 |
| 2020/0065315 A1* | 2/2020 | Huang | G06F 16/214 |

(Continued)

OTHER PUBLICATIONS

Naudet et al., A mixed CCN-MAS architecture to handle context-awareness in hybrid networks; IIMC, 2011.*

*Primary Examiner* — Daniel A Kuddus
(74) *Attorney, Agent, or Firm* — David R. Stevens; Stevens Law Group

(57) ABSTRACT

Query language statements are generated from natural language statements using a knowledge graph representing one or more databases. The knowledge graph is obtained by creating nodes representing tables and operations referenced by queries to the databases. The data of the databases is evaluated to identify entities and dimensions of entities from among the nodes. The entities are assigned human-understandable labels by an LLM. A natural language statement is converted to a knowledge graph language (KGL) statement and references in the KGL statement are replaced with references to entities in the knowledge graph. The KGL statement is then programmatically converted to a database language statement.

18 Claims, 9 Drawing Sheets

(56) References Cited

U.S. PATENT DOCUMENTS

| | | | |
|---|---|---|---|
| 2020/0210487 A1* | 7/2020 | Johnson | G06F 16/90335 |
| 2020/0342007 A1* | 10/2020 | Bracholdt | G06F 16/288 |
| 2020/0349128 A1* | 11/2020 | Portisch | G06F 16/212 |
| 2020/0349129 A1* | 11/2020 | Bracholdt | G06F 16/24578 |
| 2021/0019288 A1* | 1/2021 | Pang | G06F 16/211 |
| 2021/0019289 A1* | 1/2021 | Pang | G06F 16/2477 |
| 2021/0256033 A1* | 8/2021 | Huang | G06F 16/258 |

* cited by examiner

KNOWLEDGE GRAPH GENERATION FOR DATA WAREHOUSE

RELATED APPLICATIONS

This application claims the benefit of U.S. Provisional Patent Application 63/484,302 filed Feb. 10, 2023 and entitled Automatic Knowledge Graph Generation and Automatic Query Generation Using a Knowledge Graph and Knowledge Graph Language, which is hereby incorporated herein by reference in its entirety.

BACKGROUND

Field of the Invention

This invention relates to generating knowledge graphs for data warehouse.

BACKGROUND OF THE INVENTION

A modern business has abundant data describing every aspect of the business and the customers of the business. A collection of such data is often referred to as a data warehouse or a data lake. A data warehouse may be conveniently stored and accessed using a cloud-based database provider. Although data is abundant and highly available, it may still be difficult for decision makers to utilize the data.

It would be an advancement in the art to provide an improved approach for facilitating usage of data in a data warehouse.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
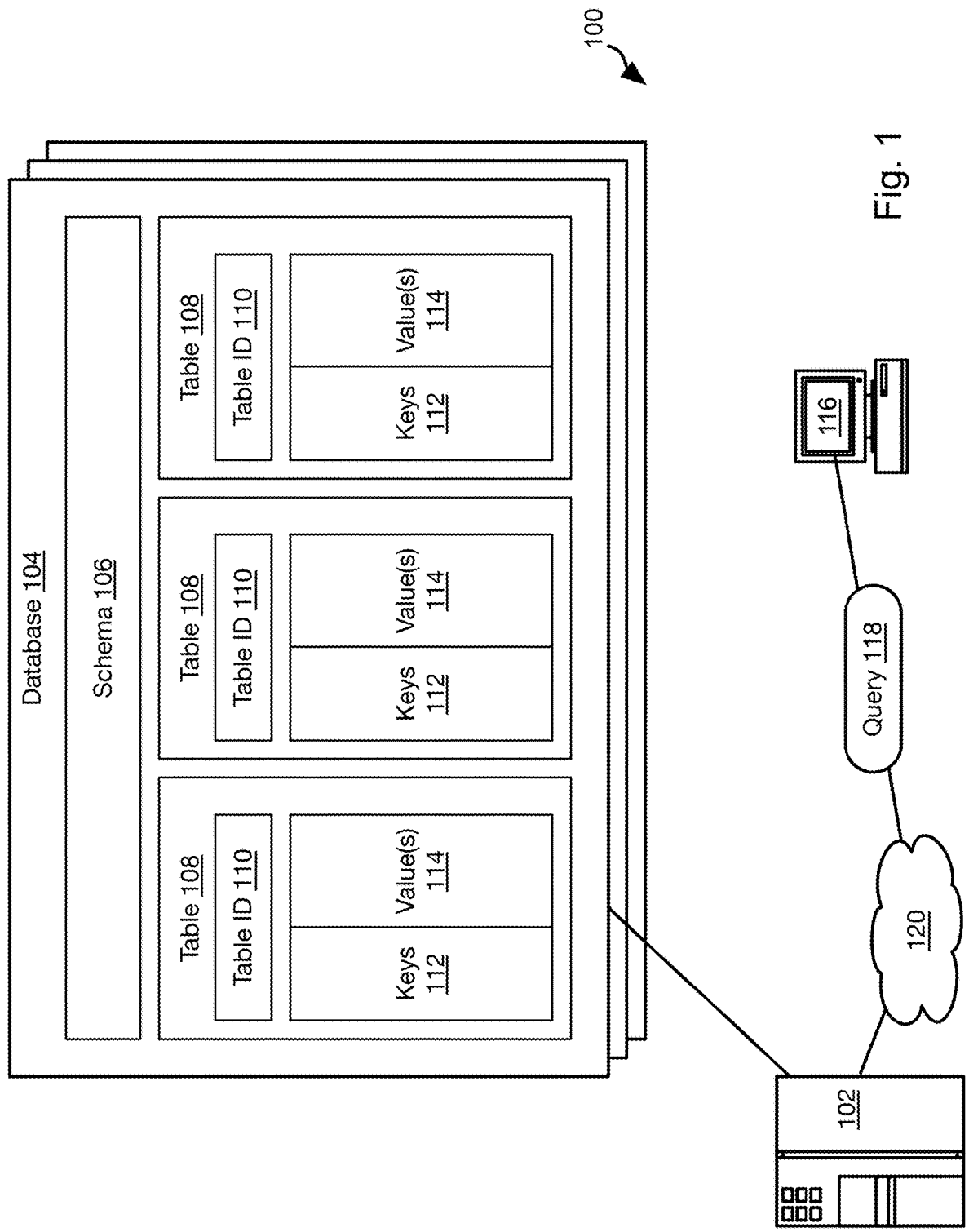
FIG. 1 is a diagram illustrating a network environment in accordance with an embodiment of the present invention.

Referring to FIG. 1, a network environment 100 may include a server system 102. The server system 102 may include one or more servers implementing a cloud computing platform or on-premise computing facility. The server system 102 may implement or access a plurality of databases 104 that collectively implement a data warehouse for one or more objects. The databases 104 may be hosted by a cloud database platform such as SNOWFLAKE, REDSHIFT, or the like. Each database 104 may correspond to a different software tool, business unit of an enterprise, geographic region, or other division.

Each database 104 may have a schema 106 that defines the logical relationship between tables 108 of the database 104. Each table 108 may include such information as a table identifier 110, a set of keys 112 and values 114 for each key 112. Each table 108 may include multiple columns, such as two or more columns in the form of a column of keys 112 and one or more columns of values for the keys 112.

Each database 104 may be implemented as a structured query language (SQL) database and the server system 102 may be implemented as an SQL server. Other types of databases may be used in a like manner, such as MYSQL, ORACLE database, IBM DB2, AMAZON RELATIONAL DATABASE SERVICE (RDS), POSTGRE SQL, or the like. SQL is referred to the throughout the following description with the understanding that any other type of database and database language may be used in a like manner.

Users at a user computing device 116 may submit queries 118 to the server system 102 by means of a network 120, such as a local area network (LAN), wide area network (WAN), the Internet, or other type of network. Queries may also be submitted by software, such as front-end software for executing ecommerce transactions, interfacing with a client application, or performing other functions. The server system 102 processes the queries with respect to one or more databases 104 referenced by the query and returns a response to the user computing device 116.

Figure 2:
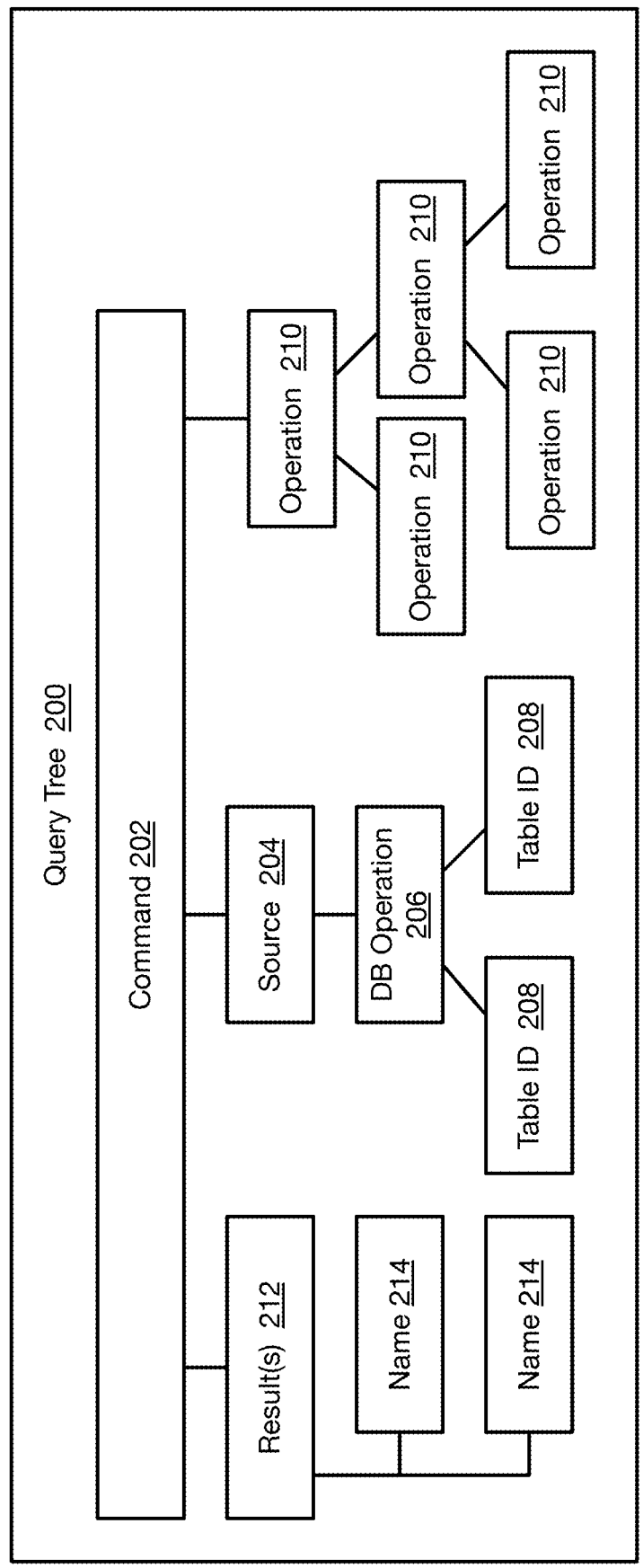
FIG. 2 is a schematic block diagram of a query tree.

Referring to FIG. 2, a query 118 may be represented as a query tree 200. The illustrated query tree 200 is exemplary only and any type of query tree known in the art may be used to represent a query 118. A query tree 200 may include a root node 202, which may represent a command included in the query. The query tree 200 may specify one or more sources 204 for data to be processed in the query. A source 204 may specify one or more database operations 206 to be performed with respect to one or more tables 208 and/or the result of another database operation 206. For example, the database operations 206 may be UNION, JOIN, IMPLICIT or other relational algebraic operation to be performed with respect to two or more tables 208.

The query tree 200 may one or more operations 210 to be performed with respect to the one or more sources 204. The operations 210 may include mathematical (addition, subtraction, multiplication, division, etc.), Boolean, or other operations to be performed with respect to the one or more sources 204. One or more inputs to each operation 210 may be one of the one or more sources 204 or the result of another operation 210. The query tree 200 may specify results 212 that identify columns of the results of the operations 210 that are to be provided as the output of the query 118. The results 212 may include names 214 that specify one or both of columns or values that are to be selected as the result and a location at which results of the operations 210 are to be stored.

Figure 3:
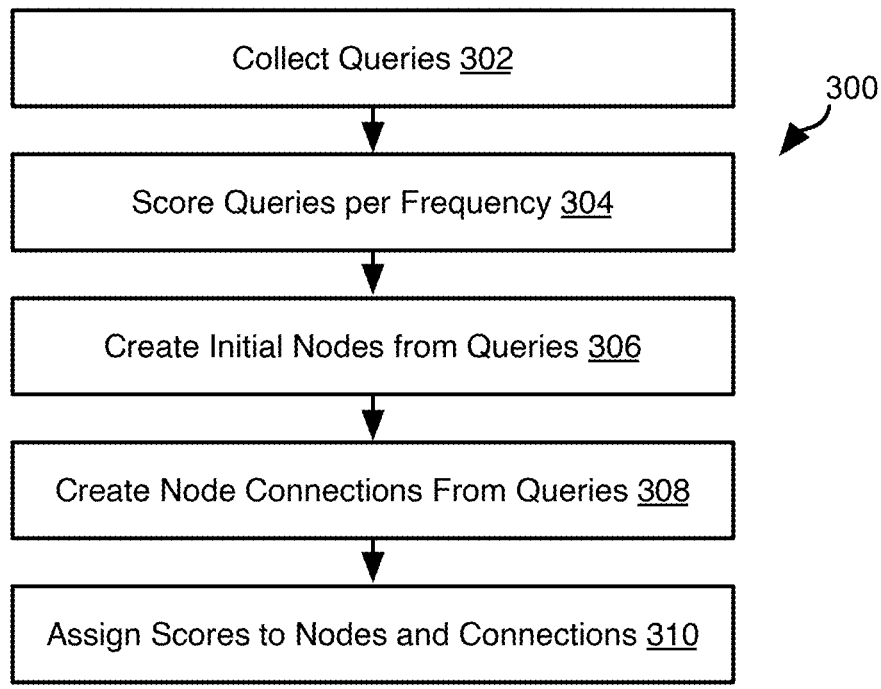
FIG. 3 is a process flow diagram of a method for extracting nodes and connections from queries to generate a knowledge graph in accordance with an embodiment of the present invention.

FIG. 3 illustrates a method 300 that may be used to create an initial network of nodes and connections that are used to conduct a knowledge graph as described in more detail below. The method 300 and the other methods disclosed herein may be executed on the server system 102, some other server system, or a combination of the two.

The method 300 includes collecting 302 queries with respect to the databases 104, such as databases 104 belonging to a common data warehouse of one or more objects. The method 300 may be performed continuously or periodically such that step 302 includes collecting queries 118 submitted to the server system 102 since a last iteration of the method 300 or within a time window (e.g., one month, one year, etc.) preceding execution of the method 300.

The method 300 may include scoring 304 queries according to frequency of occurrence. For example, queries collected at step 302 may be grouped together as being identical to one another. The number of queries in a group may then be used as the score for the queries of the group. Other factors may also contribute to the score, such as a source of the queries. Queries from software such as Tableau may be vetted and of known importance and may be given greater weight, e.g., a single query may be counted as more than one query when counting the number of occurrences of a query.

The method 300 may include creating 306 initial nodes for a knowledge graph from the queries collected at step 302. For example, for each query (which may represent a group of queries), the nodes created for the query may include nodes representing some or all of:

Each table referenced in the query.
The result of a database operation 206 with respect to one or more tables, e.g., a result of a JOIN, UNION, or other relational algebraic expression.
The result of any logical or mathematical operation 210 of the query.
One of the final results of the query.
The entire query.

Each node may be represented by a data structure describing the object (table, operation, result, query, etc.) represented by the node. For example, a node representing a table may include the table identifier 110 of the table. A node representing the operation (Ship Date—Order Date) may include data referencing a Ship Date table, an Order Date table, and the mathematical subtraction operation. The Ship Date table and Order Date table themselves may represent the result of a database operation, such as a JOIN operation that itself may be represented as a node.

The method 300 may include creating node connections from the queries selected at step 302. For example, connections between nodes may have some or all of the following types:

A connection may be created between node representing a table and a node representing a result of an operation 206, 210 performed with respect to the table.
A connection may be created between a node representing an object (Table or result of operation with respect to one or more tables) and one or more other objects that represents an operation 206, 210 performed with respect to the object and the one or more other objects.
A connection may be created between node representing the result of a first operation 206, 210 and a node representing the result of a second operation 206, 210 that takes a result of the first operation 206, 210 as an input.
A connection between a node representing a result of an operation 206, 210 of a query and the final result of the query.
A connection between a node representing a part (referenced table, result of an operation 206, 210) of a query and a node representing the entire query.

Each connection may be represented by a data structure that includes identifiers of the nodes connected by the connection and data describing the type of the connection. Note that a table may be referenced by multiple queries. Accordingly, connections created at step 308 may likewise connect nodes created from multiple queries.

Each node and connection may have a score assigned 310 thereto based on the scores from step 304. For example, for a table, the score may correspond to the total number of queries referencing the table. For nodes and connections created from queries grouped together as being identical, the nodes and connections may have scores assigned thereto equal to the number of queries in the group.

Figure 4A:
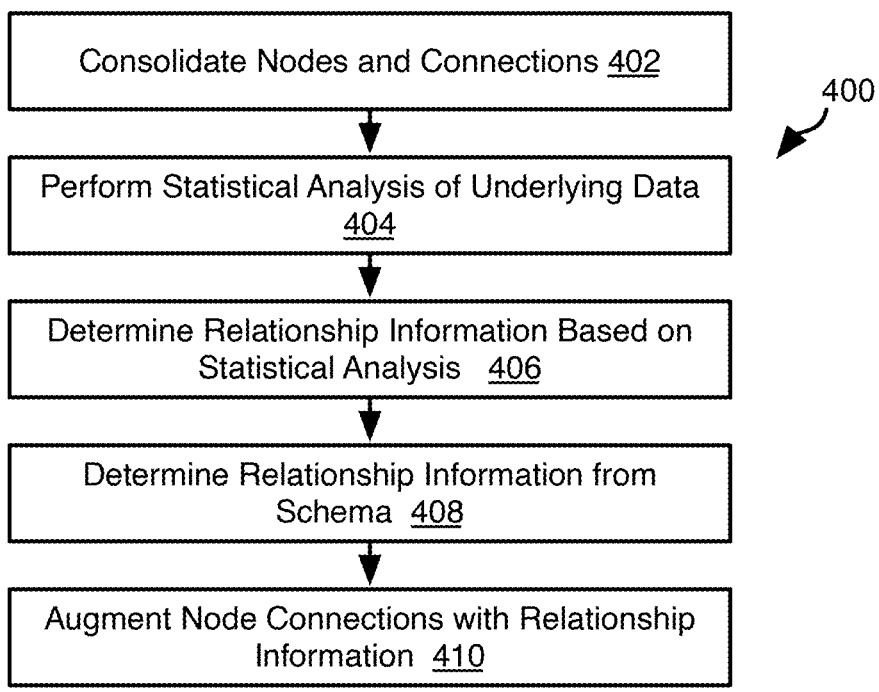
FIG. 4A is a process flow diagram of a method for augmenting the knowledge graph in accordance with an embodiment of the present invention.

Referring to FIG. 4A, the nodes, connections, and scores assigned to nodes and connections in the method 300 constitutes an initial version of a knowledge graph. FIG. 4A illustrates a method 400 for augmenting and refining the initial knowledge graph to obtain a final knowledge graph.

The method 400 may include consolidating 402 one or both of the nodes and connections of the initial version of the knowledge graph. For example, step 402 may include identifying queries that are sufficiently identical in terms of structure of operations 206, 210. Step 402 may include identifying parts of queries that are identical in terms of structures of operations 206, 210. For example, patterns of nodes and connections that are similar may be identified. As noted above, each node includes information indicating the table, operation 206, 210, or query represented by the node and each connection includes information describing the type of the connection. Accordingly, groups of identical nodes with identical connections may be identified and consolidated.

Figure 4B:
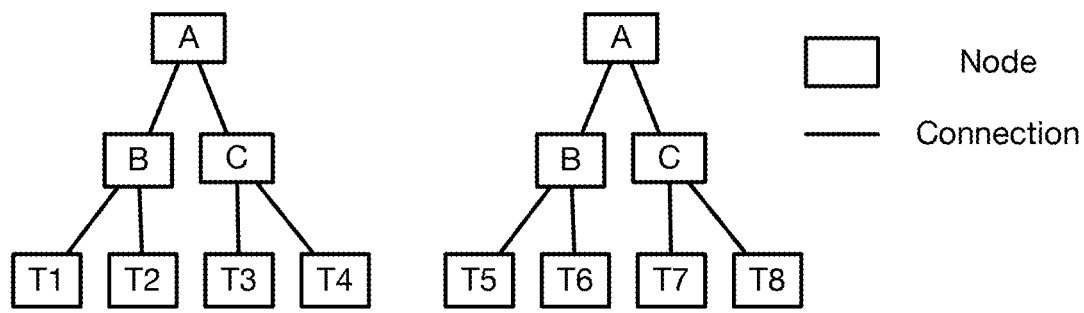
FIG. 4B illustrates groups of identical nodes and connections in an initial knowledge graph in accordance with an embodiment of the present invention.

For example, referring to FIG. 4B, suppose a first group of nodes A, B, and C include connections AB between nodes A and B and AC between nodes A and C. Nodes A, B, and C could represent any number of operations 206, 210 or queries. Suppose node B has connections to nodes T1 and T2 and node C has connections to nodes T3 and T4, where T1, T2, T3, and T4 represent tables. A second identical group of nodes A, B, and C has the same connections AB and AC but node B is connected to nodes T5 and T6 and node C is connected to nodes T7 and T8, where T5, T6, T7, and T8 represent tables. The two groups of nodes A, B, and C therefore represent two queries having identical structures but referencing different tables. For example, a query used to generate monthly reports may be issued repeatedly but reference one or more different tables corresponding to the month for which the report is generated. Accordingly, all such queries may be represented as a single node in the knowledge graph even though not identical.

Figure 4C:
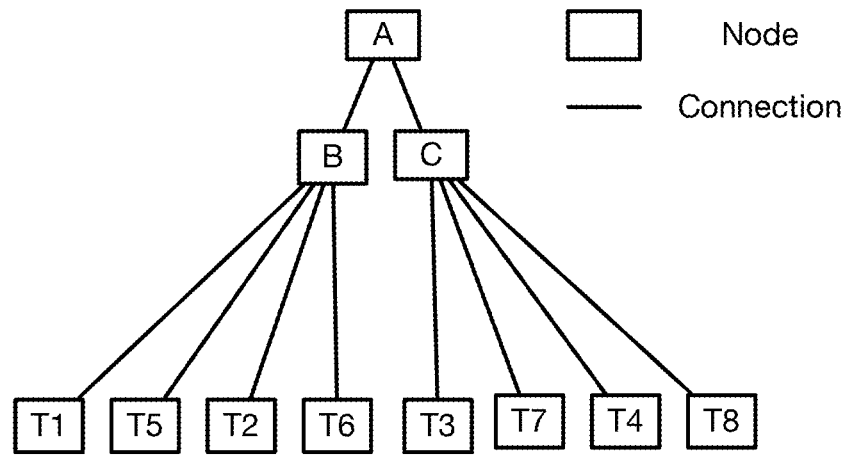
FIG. 4C illustrates a consolidation of the groups of identical nodes and connections in accordance with an embodiment of the present invention.

FIG. 4C illustrates the result of consolidation in which the groups of identical nodes and connections are represented as a single group of nodes. Connections to the group of identical nodes and connections that are not identical will then connect to the single group of nodes. Tables T1, T2, T5, and T6 are connected to node B of the consolidated group and tables T3, T7, T4, and T6 are connected to node C of the consolidated group. The scores of the consolidated group may also be combined. For example, the score of nodes A, B, and C and connections AB and BC may be the sum of the scores of nodes A, B, and C in the two original groups. Non-identical nodes representing operations 206, 210 may be handled in the same way as the non-identical tables in the above example: the non-identical nodes will remain connected to the same node in the consolidated nodes.

As an example of the approach described above with respect to FIGS. 4B and 4C, consider nodes representing the following operations "sum(case when moy=1 then 1 else 0)", "sum(case when moy=2 then 1 else 0)," and "sum(case when moy=3 then 1 else 0)", where "moy" refers to the month of the year. These nodes all have identical structures with different referenced data, e.g., referring to different months. These nodes may therefore be consolidated 402 into a single node having nodes for each month of the year (1-12).

The method 400 may include performing 404 statistical analysis of the underlying data and determining 406 relationship information based on the statistical analysis. For example, for a node representing a table, statistical information concerning the values in the table may be determined. For example, the statistical information may include whether values in a column of the table are unique relative to one another and possibly unique relative to values in other columns of the table or other tables.

In a first example, each customer identifier in a customer identifier table may be unique whereas different customer identifiers may have the same birth date from a birth date table, thereby indicating that the birth date table is a dimension of the customer identifier table.

In a second example, if there is a JOIN operation between a key of a first table and a column of a second table, the node representing the first table may be deemed to be a key node whereas the second table is deemed a dimension node of the key node.

In a third example, in a table including order identifiers, all of the order identifiers may be unique whereas other values such as dates, states, zip codes, and product identifiers, price, etc. may be the same in multiple rows. Accordingly, the order identifier may be chosen to be a key node whereas tables of dates, states, zip codes, product identifiers, price, etc. may be deemed dimension nodes having a dimension relationship to the key node.

In a fourth example, a node may represent a join of an order identifier table, a sold date table, and item identifier table. Since the sold date for each item in the same order is the same, the date, as represented by the date table, may be deemed a dimension of the order identifier, as represented by the order identifier table.

In a fifth example, or a given combination of an order identifier and item identifier (i.e., the same order), all prices are constant. Accordingly, for a node representing the combination (e.g., a joint of columns or tables for the order identifier and item identifier), the price, as represented by a price table, may be a dimension. The combination may be identified due to one or more queries performing a JOIN on two tables or columns of tables.

Many databases have a schema 106, such as databases generated by or provided by a software as a service (SaaS) company, such as SALESFORCE, MARQETA, SEGMENT, or the like. The schema 106 may indicate the meaning of data stored in tables and the relationships between tables, such as the meaning of the data stored in each column of each table. Accordingly, the method 400 may include determining 408 relationships from any schemas 106 for the databases 104 hosting tables 108 referenced by the initial knowledge graph, including which nodes are key nodes according to the schemas 106 and which nodes are dimension nodes to a given key node.

The initial knowledge graph may then be augmented 410 with the relationship information from one or both of steps 406 and 408. For example, a connection between a key node and a dimension node as determined at step 406 and 408 may be augmented with information indicating that the connection represents a dimension relationship and the direction of the relationship, i.e., which node is the dimension node and which node is the key node. Other type of relationships, such as between key nodes, may be a "one-to-many" relationship, such as between a key node representing a customer identifier and a key node representing customer orders since a single customer may have multiple orders.

Figure 5:
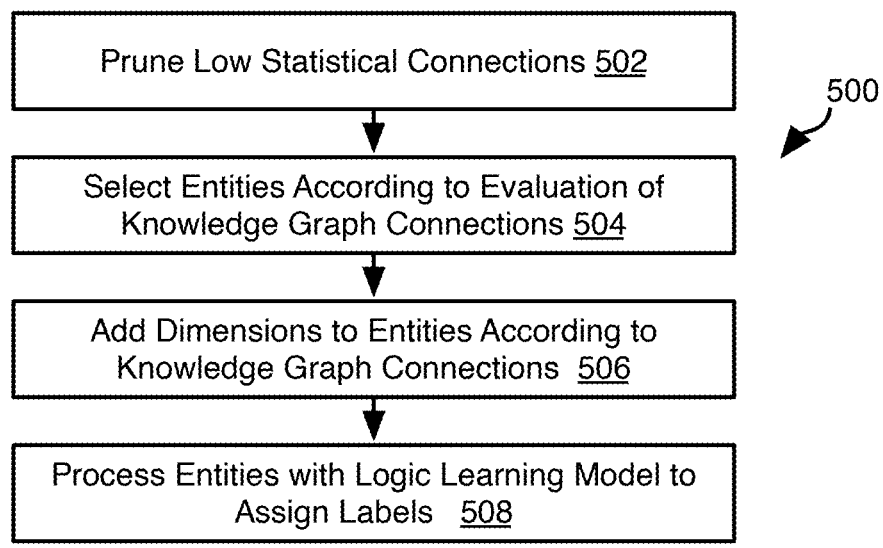
FIG. 5 is a process flow diagram of a method for generating human intelligible entities from the knowledge graph in accordance with an embodiment of the present invention.

FIG. 5 illustrates a method 500 for generating an entity graph for final knowledge graph resulting from the method 400. The entity graph may be considered as a human intelligible overlay or subset for the knowledge graph. The entity graph is also formed to include entities likely to be of importance to decision makers.

The entity graph may be derived from the final knowledge graph by pruning 502 connections with low statistical significance. As noted above, connections may be assigned a score based on the number of queries represented by the connection. Accordingly, connections with a low score are not of high interest to users of the databases 104 and may be pruned. Connections with low statistical significance may be those with a score below a predetermined threshold. Connections with low statistical significance may be X percent of the connections with the lowest scores, where X is a predetermined value, such as a value between 0 and 90, 0 and 75, 0 and 50, or 0 and 25.

The method 500 may include selecting 504 nodes of the knowledge graph as entities of the entity graph according to evaluation of the connections between nodes of the knowledge graph and adding 506 nodes from the knowledge graph to the entities as dimensions of the entities according to connections of the knowledge graph. For example, a node representing a customer identifier may be an entity whereas nodes representing attributes of a customer (address, state, orders, etc.) are added as dimensions. In another example, a node representing an order identifier node may be selected as an entity whereas nodes representing tables for purchase date, ship date, item identifiers, purchase price, or other attributes of an order are added as dimensions of the entity.

In one example, key nodes are selected as entities for the entity graph and dimension nodes are added to the entities as dimensions. In another example, only a subset of key nodes are selected as entities, such as the top Y with the highest score, where X is a predetermined value, such as a value between 10 and 20, 20 and 50, 50 and 80, or 80 and 100.

For each entity created for a key node, dimensions may be added to the entity for each dimension node of the knowledge graph connected to the entity. Connections between entities may be retained in the entity graph, i.e., connections between key nodes of the knowledge graph.

To further enhance usability of the entity graph, entities and possibly dimensions may be processed 508 by a logical learning model (LLM) to assign human-intelligible labels to the entities of the entity graph. The LLM may be an LLM trained to perform the labeling of step 508 or may be a general purpose LLM such as CHATGPT, BARD, or the like.

For example, for an entity, the LLM may receive the name of the object in the databases 104 (e.g., table identifier 110). The LLM may additionally or alternatively receive underlying data for the entity and possibly the objects represented by dimensions of the entity, such as the contents of the table represented by the entity or dimension of the entity, the results of an operation represented by the entity or dimension of the entity, or other information.

The LLM outputs a human-intelligible label based on the inputs that captures the concept represented by the entity. For example, a database table 108 for customer identifiers may be labeled CK_customer_db and have dimensions such as 2022_order_db, NA_address_db, or any arbitrary names. The names of tables represented by entities and dimensions may even be arbitrary codes, e.g., GX_2023_CM. By evaluating the identifiers, the underlying data (e.g., orders, addresses, birth date, and other human-related information), the LLM may derive that a table can be represented by the label "customer."

In some embodiments, the LLM may provide superior results if the entity graph in its entirety, or at least groups of multiple entities and their corresponding dimensions, is submitted to the LLM with the task of assigning unique names to each entity (or possibly to each entity and each dimension).

Figure 6:
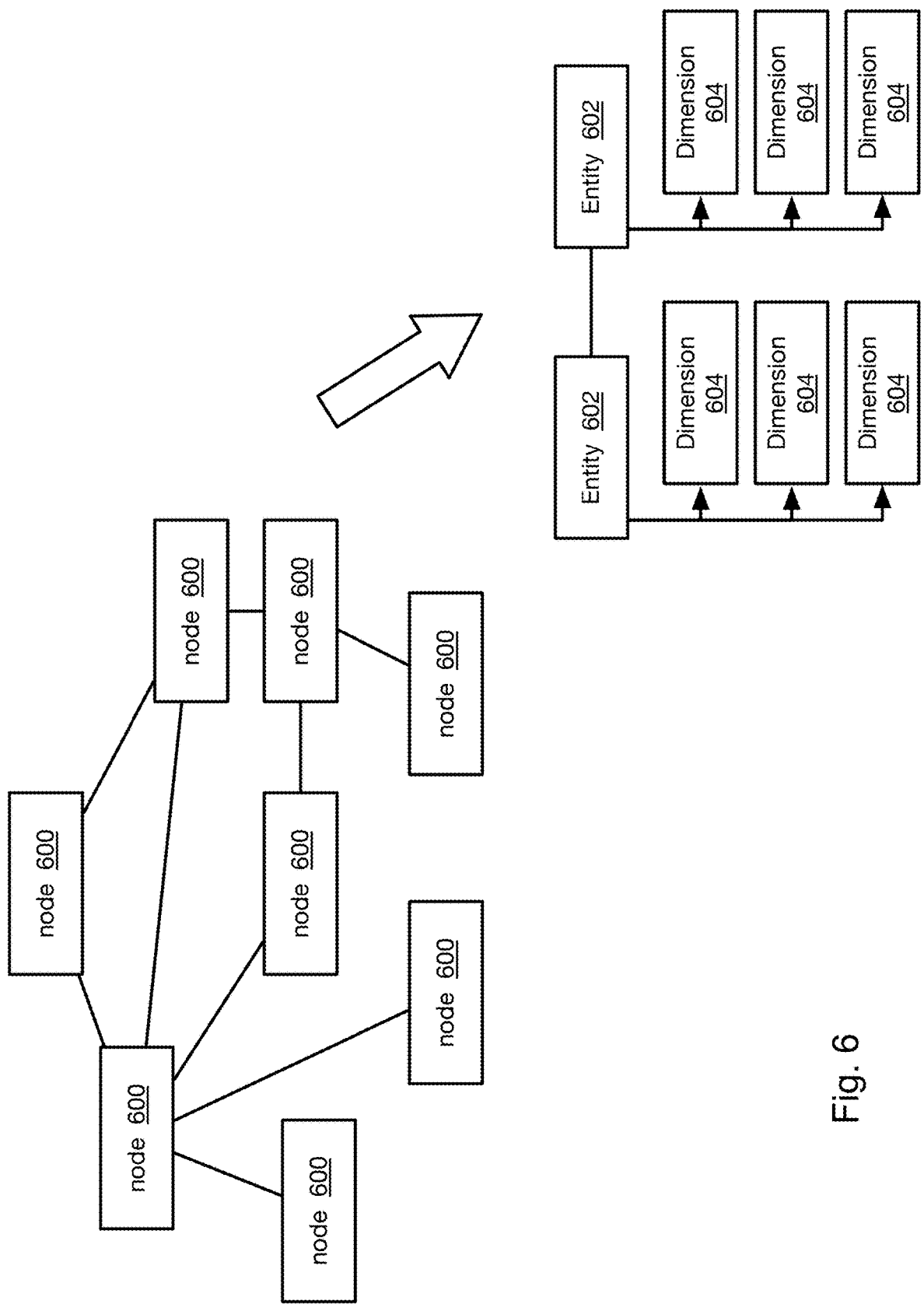
FIG. 6 is a diagram illustrating the transformation of a knowledge graph into an entity graph in accordance with an embodiment of the present invention.

Referring to FIG. 6, the method 500 converts the knowledge graph consisting of nodes 600 and connections between nodes to an entity graph that includes entities 602 representing significant concepts represented in the databases 104 along with dimensions 604 of each entity 602 that are descriptive of the concept represented by the entity 602. As described above, the entities 602 and dimensions 604 are selected based on actual queries submitted by users of the databases 104. The entities 602 of and dimensions 604 of the entity graph further have human-intelligible labels that are easy to remember or guess by a user without expert knowledge of the underlying databases 104. Connections between nodes selected as entities (e.g., other than dimensions) may also be retained, such as a one-to-many connection described above or any of the other types of connections that may exist between nodes of the knowledge graph.

Figure 7:
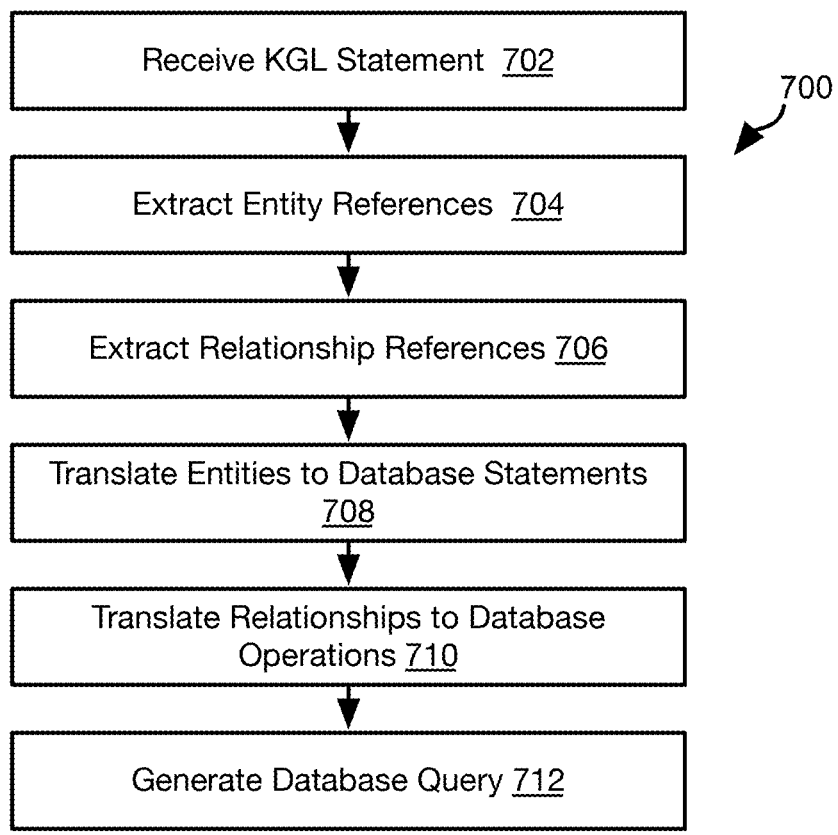
FIG. 7 is a process flow diagram of a method for using a knowledge graph language (KGL) to generate database queries from human-intelligible KGL statements in accordance with an embodiment of the present invention.

Referring to FIG. 7, the queries 118 submitted to the server system 102 for execution with respect to the databases 104 must be written in a database language, such as SQL in order to be intelligible by the server system 102, such as by a database server executing on the server system 10. However, a database language such as SQL is not intuitive and requires extensive knowledge that is not possessed by many decision makers.

The knowledge graph generated according to the approach described with respect to FIGS. 1 to 6 may be accessed using a knowledge graph language (KGL). The KGL may be a language that both (a) uses operators, variables, and syntax that mimic human speech and (b) can be programmatically translated into an SQL query, i.e., in a fixed and predictable manner without ambiguity as to meaning of terms used in a KGL statement. As such, the KGL functions as an intermediate language between the ambiguity of natural language and the complex technical requirements of an SQL query.

For example, a user may wish for information about "customers who were born in Texas." This natural language statement can be readily expressed by the user in KGL as "customers where CurrentAddressState='TX.'" As another example, a user may wish for information about "Customers who have more than one order." This natural language statement can be expressed in KGL as "customers where count(orders)>1."

The KGL may have at least some of the following properties:

Variables do not require special declarations.

A source of the requested information can be expressed in a position or other syntax used to recite the subject of a natural language is expressed in a given language.

An operation may be specified using a prepositional phrase including a preposition indicating an operation (e.g., "where," "who," or other interrogative) and a subject of the prepositional phrase indicating an argument to the operation (e.g., state=Texas, count(orders)>1).

Database operations such as JOIN, UNION, IMPLICIT, EXPLICIT are either transparent to the user or are represented using natural language conjunctions, such as "and, "or," or the like.

An operation may be specified for one or more entity names using conventional mathematical symbols (+, −, *, /), conventional mathematical function names (exp, sin, cos, etc.), conventional statistical functions (count, max, min, mean, median, standard deviation), or Boolean operators (AND, OR, XOR, NOT), The KGL may be constrained with respect to a knowledge graph, such that variables included in a KGL statement are constrained to be entities 602 or dimensions 604 of the entity graph. However, inasmuch as the entities 602 and dimensions 604 are assigned human-intelligible labels, usage of the knowledge graph is made simple. For example, a KGL editor may provide a graphical representation of the entity graph in the form of a directory structure or other graphical representation of the hierarchical structure of the entity graph. A user may therefore select view entities in the entity graph and select therefrom. Likewise, interface aids such as autocomplete may provide suggestions for entities in the entity graph in response to a string input by a user. A search interface to the entity graph may further enable a user to search for potentially relevant entities and dimensions from the entity graph based on a natural language search string. For example, a search engine may enable a user search for an entity matching a natural language search string based on lexical and/or semantic similarity to labels of entities, the labels of the dimensions of entities in the entity graph, and/or a combination thereof. The interface aids may further enable a user to invoke display of the dimensions of an entity in the entity graph.

FIG. 7 illustrates a method 700 that may be executed to interpret a KGL statement received from a user. The method 700 may include receiving 702 a KGL statement. The KGL statement may be parsed to extract 704 the names of entities of the entity graph. The KGL statement may be further parsed to extract 706 relationship references from the KGL statement. The relationship references indicate the role of the entities in the KGL statement. For example, in the example "customers where state=Texas," the relationship of "customers" is being first recited of all the recited elements. The relationship of "state=Texas" is the reference following the interrogative "where" following the first element.

Each entity references identified at step 704 may be translated 708 into database language statements, e.g., SQL statements ("entity statements"). For example, if an entity represents a table 108, a database language statements referencing the table 108 may be generated. As noted above, a node in the knowledge graph may represent the result of a database operation 206 or operation 210 performed with respect to one or more tables 108 or the result of another operation 206 or operation 210. Accordingly, a database language statement may be generated that invokes execution one or more operations 206 or operations 210 with respect to one or more tables 108 represented by an entity referenced in the KGL statement.

The relationships identified at step 706 may be translated 710 into database language statements implementing an operation 206 and/or operation 210 corresponding to the recited relationships ("relationship statement").

The method 700 may then include generating 712 a database query. For example, the entity statements and relationship statements may be combined along with other statements required by the database language to form a query representing the KGL statement. An entity may represent an operation performed with respect one or more objects that may be tables, the results of other operations, or the like. Accordingly, generating 712 the database query may include substituting database language statements to implement the operation represented by the entity and any operations generating a result processed by the operation.

The query may then be input to the server system 102 and a result of the query returned to the source of the KGL statement. The result of the query may be formatted or otherwise processed to facilitate understanding of the result, such as using Tableau or other interface generator.

Figure 8:
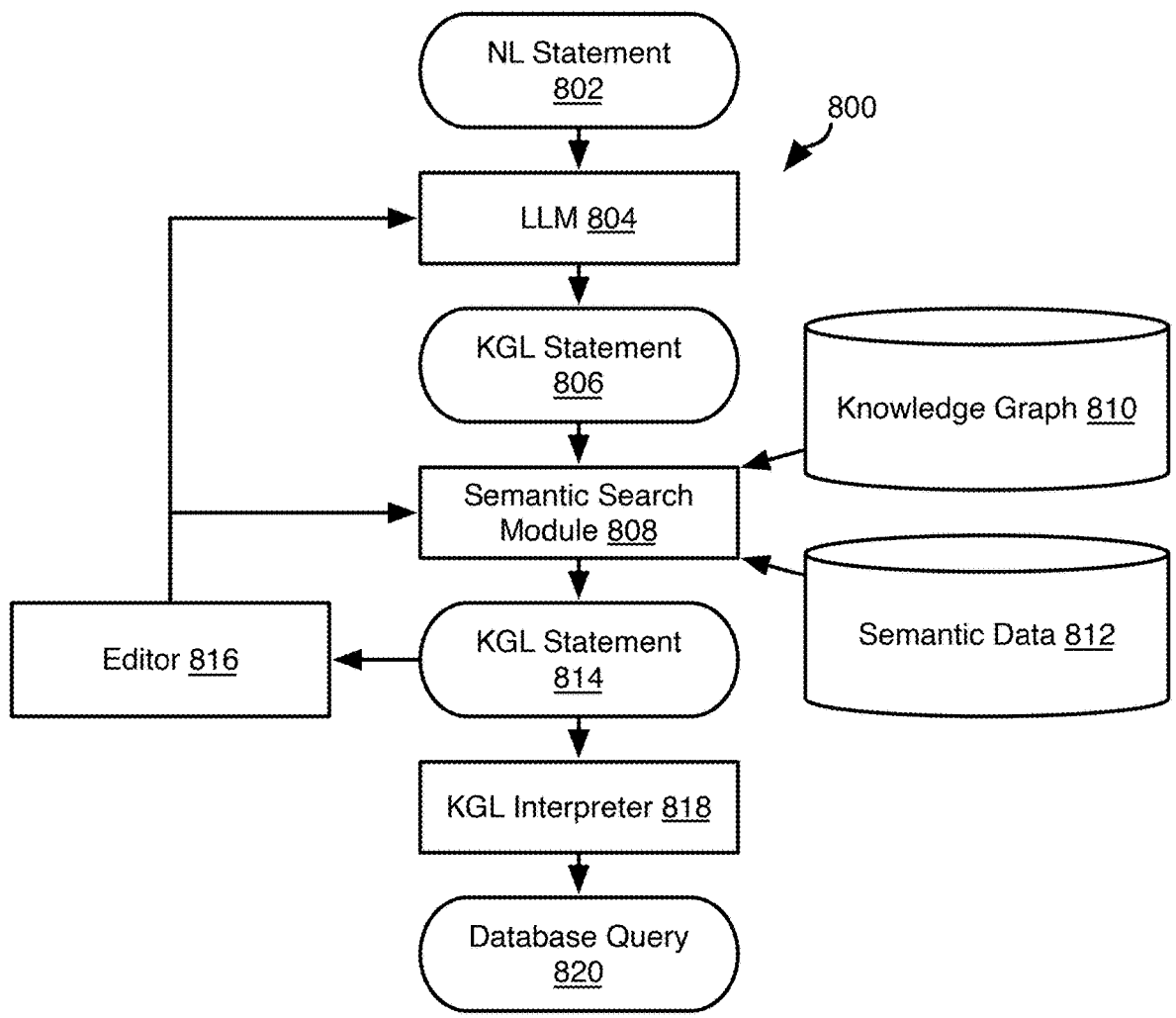
FIG. 8 is a process flow diagram of a system for converting a natural language statement into a database query in accordance with an embodiment of the present invention.

Referring to FIG. 8, the proximity of KGL statements to natural language statements may be used to translate natural language statements into KGL statements. The illustrated system 800 enables user to formulate a natural language statement describing desired information, generate and revise a corresponding KGL statement, and submit an database language statement to the server system 102. The system 800 enables the user to do so with no knowledge of the databases 104 or the database language used to access the databases 104.

For example, the system 800 may receive a natural language statement 802 from a user, such as from an interface executing on the user computing device 116. The system 800 processes the natural language statement 802 using an LLM 804 to generate a KGL statement 806. The KGL statement 806 is a preliminary KGL statement and the entities referenced therein may not actually correspond to the labels of entities in the entity graph. However, the KGL statement 806 may have the form and structure of a KGL statement.

The LLM 804 may be trained with a plurality of KGL statements and instructed to imitate the structure and form of the KGL statements. The LLM may be general purpose LLM that is provide the KGL statements and the natural language statement 802 and instructed to convert the natural language statement 802 into a KGL statement.

The KGL statement may be processed using a semantic search module 808. The semantic search module 808 receives the KGL statement 806 and, for each entity referenced in the KGL statement 806 ("input entity"), searches for a corresponding entity in a knowledge graph 810 ("KG entity").

The semantic search module 808 may access the knowledge graph 810 as well as semantic data 812. The semantic data 812 may include such information as concepts represented by words or phrases and relationships between concepts in the form of a graph. The labels of the entities in the knowledge graph 810 may be selected from among the concepts in the semantic data 812. The semantic module 808 may search for a concept in the knowledge graph 810 that is related to the input entity based on one or both of lexical (i.e., spelling) similarity and semantic (i.e., meaning) similarity as indicated in the semantic data 812. The semantic module 808 may, for example, seek for concepts related to each input entity in the semantic graph and attempt to identify the KG entity in the knowledge graph 810 that is connected to the same concepts either directly or by way of the labels for the dimensions of the entity.

The semantic search module 808 may further take into account the structure of the KGL statement 806. For example, where the KGL statement 806 includes reference A in the role of an entity, reference B as a dimension of the entity, and reference C as a value for the dimension, the semantic search module 808 will therefore search for an entity corresponding to reference A in terms of lexical and semantic similarity and having a dimension that corresponds to reference B in terms of lexical and semantic similarity, and having a possible value of C for the dimension. For example, in the KGL statement "Customer where Location='TX' AND Birth Year="1996", the entity is Customer, the dimensions are Location and Birth Year, and the values are "TX" and "1996." Where there are multiple dimensions, the dimensions may be searched separately, e.g. a combination of "Customer" and "Location" and a combination of "Customer and "Birth Year." Entities identified as a result of both searches may then be evaluated to select an entity for "Customer" and dimensions of the entity corresponding to "Location" and "Birth Year."

The semantic search module 808 replaces each input entity in the KGL statement with the corresponding KG entity identified by the semantic search module 808, where the KG entity is different from the input entity, to obtain KGL statement 814. The KGL statement may be displayed in an editor 816, such as using an interface displayed on the user device 116 from which the NL statement 802 was received. The user may revise the KGL statement 814 using the editor 816. The user may revise the KGL statement 814 by changing the entities referenced in the KGL statement 814 and relationships between entities in the KGL statement 814. The editor 816 may implement some or all of the functions described above for an interface for receiving the input of KGL statements. In particular, the editor 816 may enable a user to view the knowledge graph, view the dimensions of an entity referenced in a KGL statement, provide suggested or possible values for an entity referenced in a KGL statement, or other aids to the editing of KGL statements.

If the user makes changes to the KGL statement 814, the revised KGL statement may be processed in various ways. In a first approach, the revised KGL statement is treated as a new natural language statement and processing repeats by inputting the revised KGL statement to the LLM 804. In a second approach, the revised KGL statement is input to the semantic search module to ensure that each entity referenced in the revised KGL statement is represented in the knowledge graph. In some embodiments, the first approach is used if the relationships included in the KGL statement 814 are revised and the second approach is used if only the entities referenced in the KGL statement 814 is changed.

Once a KGL statement 814 is approved by a user, the KGL statement 814 may be passed to a KGL interpreter 818. The KGL interpreter 818 interprets the KGL statement 814 to generate a database query 820. For example, the KGL interpreter 818 may implement the method 700 with respect to the KGL statement 814.

The database query 820 may be submitted to the server system 102, processed by the server system 102, and a result of the query returned to the source of the natural language statement 802, such as the user computing device 116. The result of the query 820 may be formatted or otherwise processed to facilitate understanding of the result, such as using Tableau or other interface generator.

As an example use case of the system 800, the natural language statement received from a user may be "customers who live in TX." The KGL statement 814 derived therefrom may be "Customers where CurrentAddressState='TX.'" The database query 820 generated from the KGL statement 814 may be an SQL statement such as:

WITH table_0 AD (SELECT customer.c_customer_sk AD output FROM tpcds_1000.customer JOIN tpcds_1000.customer_address AD customer_address_0 ON customer.c_current_addr_sk=customer_address_0.ca_address_sk WHERE customer_address_0.ca_state='TX') SELECT*FROM table_0

As is readily apparent, generating the database query 820 would require much greater knowledge of SQL as well as the underlying databases 104. However, using the system 800, a user may generate the query 820 simply by typing a natural language statement and possibly editing a readily understandable KGL statement 814.

Figure 9:
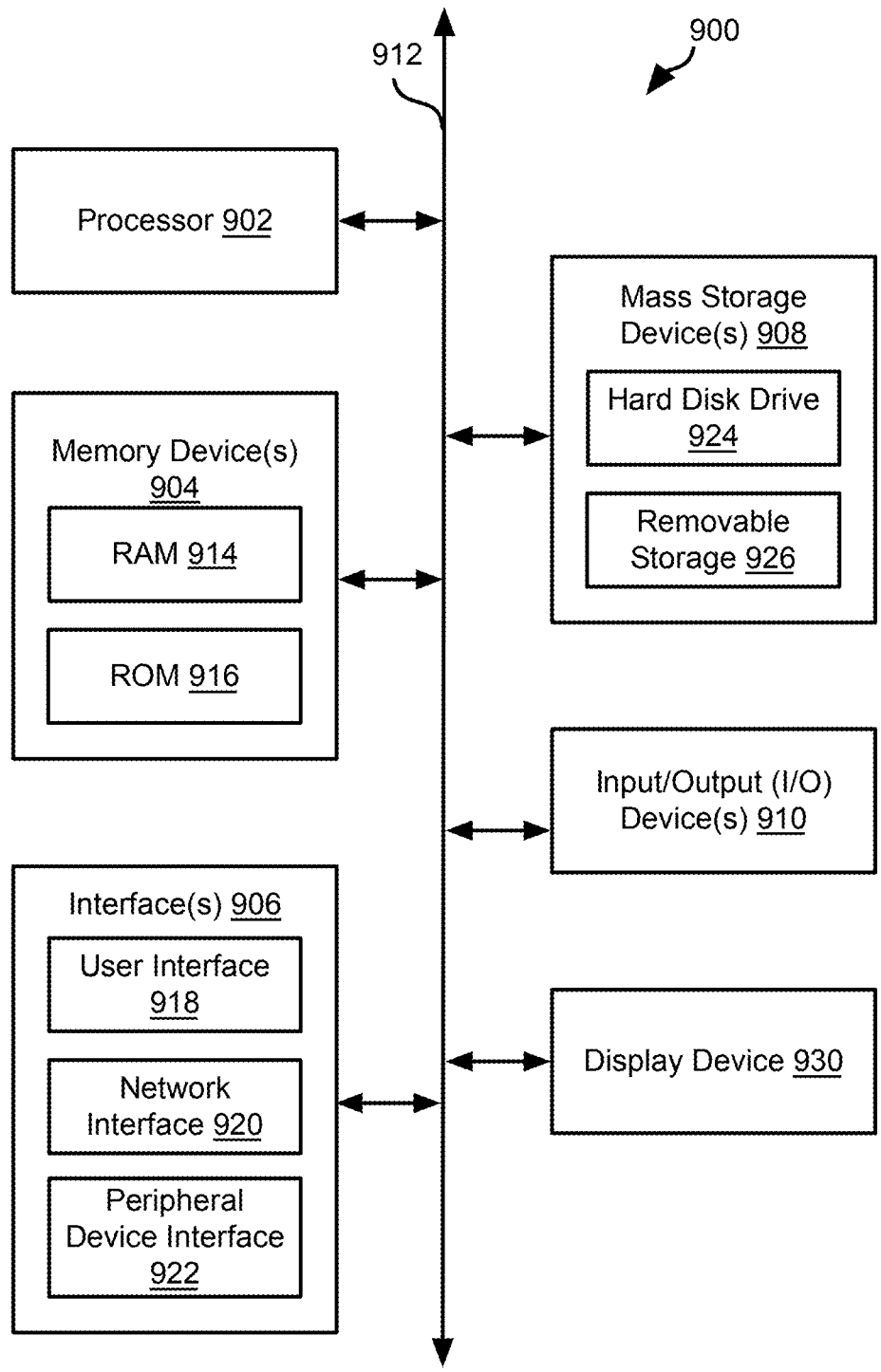
FIG. 9 is a schematic block diagram illustrating an example computing device suitable for implementing methods in accordance with embodiments of the present invention.

FIG. 9 is a block diagram illustrating an example computing device 900. Computing device 900 may be used to perform various procedures, such as those discussed herein. The server system 102 may include one or more computing devices 900 and a user computing device 116 may be embodied as a computing device 900.

Computing device 900 includes one or more processor(s) 902, one or more memory device(s) 904, one or more interface(s) 906, one or more mass storage device(s) 908, one or more Input/Output (I/O) device(s) 910, and a display device 930 all of which are coupled to a bus 912. Processor(s) 902 include one or more processors or controllers that execute instructions stored in memory device(s) 904 and/or mass storage device(s) 908. Processor(s) 902 may also include various types of computer-readable media, such as cache memory. The processor 902 may be embodied as or further include a graphics processing unit (GPU) including multiple processing cores.

Memory device(s) 904 include various computer-readable media, such as volatile memory (e.g., random access memory (RAM) 914) and/or nonvolatile memory (e.g., read-only memory (ROM) 916). Memory device(s) 904 may also include rewritable ROM, such as Flash memory.

Mass storage device(s) 908 include various computer readable media, such as magnetic tapes, magnetic disks, optical disks, solid-state memory (e.g., Flash memory), and so forth. As shown in FIG. 9, a particular mass storage device is a hard disk drive 924. Various drives may also be included in mass storage device(s) 908 to enable reading from and/or writing to the various computer readable media. Mass storage device(s) 908 include removable media 926 and/or non-removable media.

I/O device(s) 910 include various devices that allow data and/or other information to be input to or retrieved from computing device 900. Example I/O device(s) 910 include cursor control devices, keyboards, keypads, microphones, monitors or other display devices, speakers, printers, network interface cards, modems, lenses, CCDs or other image capture devices, and the like.

Display device 930 includes any type of device capable of displaying information to one or more users of computing device 900. Examples of display device 930 include a monitor, display terminal, video projection device, and the like.

Interface(s) 906 include various interfaces that allow computing device 900 to interact with other systems, devices, or computing environments. Example interface(s) 906 include any number of different network interfaces 920, such as interfaces to local area networks (LANs), wide area networks (WANs), wireless networks, and the Internet. Other interface(s) include user interface 918 and peripheral device interface 922. The interface(s) 906 may also include one or more peripheral interfaces such as interfaces for printers, pointing devices (mice, track pad, etc.), keyboards, and the like.

Bus 912 allows processor(s) 902, memory device(s) 904, interface(s) 906, mass storage device(s) 908, I/O device(s) 910, and display device 930 to communicate with one another, as well as other devices or components coupled to bus 912. Bus 912 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 900, and are executed by processor(s) 902. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

These example devices are provided herein purposes of illustration, and are not intended to be limiting. Embodiments of the present disclosure may be implemented in further types of devices, as would be known to persons skilled in the relevant art(s). At least some embodiments of the disclosure have been directed to computer program products comprising such logic (e.g., in the form of software) stored on any computer useable medium. Such software, when executed in one or more data processing devices, causes a device to operate as described herein.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

What is claimed is:

1. A method for accessing one or more databases comprising:
   receiving, by a computing device, a plurality of queries to the one or more databases;
   creating, by the computing device, a plurality of nodes and a plurality of connections among the plurality of nodes according to the plurality of queries, wherein each node of the plurality of nodes represents an object of a plurality of objects referenced in the plurality of queries and wherein each connection of the plurality of connections represents a relationship between two objects of the plurality of objects in the plurality of queries;
   processing, by the computing device, at least one of data stored in the one or more databases and one or more schemas of the one or more databases to identify first nodes of the plurality of nodes that represent dimensions of second nodes of the plurality of nodes;
   assigning, by the computing device, names to at least the second nodes according to at least one of identifiers of the objects represented by the second nodes and content of the objects represented by the second nodes; and
   for each query of the plurality of queries:
      determining a frequency of occurrence of each query; and
      assigning a score to each node of the plurality of nodes and each connection of the plurality of connections representing each query according to the frequency of occurrence.

2. The method of claim 1, wherein creating, by the computing device, the plurality of nodes and the plurality of connections among the plurality of nodes according to the plurality of queries comprises, for each query of the plurality of queries:
   generating a query tree of each query including references to one or more tables of the one or more databases and one or more operations;
   adding nodes to the plurality of nodes for the one or more tables and the one or more operations; and
   adding connections to the plurality of connections according to a structure of the query tree.

3. The method of claim 2, wherein the one or more operations include one database operations.

4. The method of claim 2, wherein the one or more operations include at least one of a mathematical or logical operation.

5. The method of claim 1, further comprising pruning a portion of the plurality of connections according to the scores assigned to the plurality of connections.

6. The method of claim 1, wherein processing the at least one of data stored in the one or more databases and one or more schemas of the one or more databases to identify the first nodes of the plurality of nodes that represent the dimensions of the second nodes of the plurality of nodes comprises:
   determining that a first node of the first nodes representing a first table represents a dimension of a second node of the second nodes representing a second table in response to determining that, in a join of the first table and the second table, values of the first table are unique whereas values of the second table are not unique.

7. The method of claim 1, wherein processing the at least one of data stored in the one or more databases and one or more schemas of the one or more databases to identify the first nodes of the plurality of nodes that represent the dimensions of the second nodes of the plurality of nodes comprises:
   determining that a first node of the first nodes representing a first table represents a dimension of a second node of the second nodes representing a second table in response to a schema of the one or more schemas.

8. A method for accessing one or more databases comprising:
   receiving, by a computing device, a plurality of queries to the one or more databases;
   creating, by the computing device, a plurality of nodes and a plurality of connections among the plurality of nodes according to the plurality of queries, wherein each node of the plurality of nodes represents an object of a plurality of objects referenced in the plurality of queries and wherein each connection of the plurality of connections represents a relationship between two objects of the plurality of objects in the plurality of queries;
   processing, by the computing device, at least one of data stored in the one or more databases and one or more schemas of the one or more databases to identify first nodes of the plurality of nodes that represent dimensions of second nodes of the plurality of nodes; and
   assigning, by the computing device, names to at least the second nodes according to at least one of identifiers of the objects represented by the second nodes and content of the objects represented by the second nodes;
   wherein assigning the names to the at least second nodes according to the at least one of identifiers of the objects represented by the second nodes and content of the objects represented by the second nodes comprises using a logic learning model.

9. The method of claim 1, wherein the plurality of queries are structure query language (SQL) queries.

10. A system comprising:
    one or more databases; and
    a server system comprising one or more processing devices and one or more memory devices, the server system configured to:
       receive a plurality of queries to the one or more databases;
       create a plurality of nodes and a plurality of connections among the plurality of nodes according to the plurality of queries, wherein each node of the plurality of nodes represents an object of a plurality of objects referenced in the plurality of queries and wherein each connection of the plurality of connections represents a relationship between two objects of the plurality of objects in the plurality of queries;
       process at least one of data stored in the one or more databases and one or more schemas of the one or more databases to identify first nodes of the plurality of nodes that represent dimensions of second nodes of the plurality of nodes; and assign names to at least the second nodes according to at least one of identifiers of the objects represented by the second nodes and content of the objects represented by the second nodes;

wherein the server system is further configured to, for each query of the plurality of queries:

determine a frequency of occurrence of each query; and assign a score to each node of the plurality of nodes and each connection of the plurality of connections representing each query according to the frequency of occurrence.

11. The system of claim 10, wherein the server system is further configured to create the plurality of nodes and the plurality of connections among the plurality of nodes according to the plurality of queries by, for each query of the plurality of queries:

generating a query tree of each query including references to one or more tables of the one or more databases and one or more operations;

adding nodes to the plurality of nodes for the one or more tables and the one or more operations; and adding connections to the plurality of connections according to a structure of the query tree.

12. The system of claim 11, wherein the one or more operations include one database operations.

13. The system of claim 11, wherein the one or more operations include at least one of a mathematical or logical operation.

14. The system of claim 10, wherein the server system is further configured to prune a portion of the plurality of connections according to the scores assigned to the plurality of connections.

15. The system of claim 10, wherein the server system is further configured to process the at least one of data stored in the one or more databases and one or more schemas of the one or more databases to identify the first nodes of the plurality of nodes that represent the dimensions of the second nodes of the plurality of nodes by:

determining that a first node of the first nodes representing a first table represents a dimension of a second node of the second nodes representing a second table in response to determining that, in a join of the first table and the second table, values of the first table are unique whereas values of the second table are not unique.

16. The system of claim 10, wherein the server system is further configured to process the at least one of data stored in the one or more databases and one or more schemas of the one or more databases to identify the first nodes of the plurality of nodes that represent the dimensions of the second nodes of the plurality of nodes by:

determining that a first node of the first nodes representing a first table represents a dimension of a second node of the second nodes representing a second table in response to a schema of the one or more schemas.

17. The system of claim 10, wherein the plurality of queries are structure query language (SQL) queries.

18. A system comprising:

one or more databases; and a server system comprising one or more processing devices and one or more memory devices, the server system configured to:

receive a plurality of queries to the one or more databases;

create a plurality of nodes and a plurality of connections among the plurality of nodes according to the plurality of queries, wherein each node of the plurality of nodes represents an object of a plurality of objects referenced in the plurality of queries and wherein each connection of the plurality of connections represents a relationship between two objects of the plurality of objects in the plurality of queries;

process at least one of data stored in the one or more databases and one or more schemas of the one or more databases to identify first nodes of the plurality of nodes that represent dimensions of second nodes of the plurality of nodes; and assign names to at least the second nodes according to at least one of identifiers of the objects represented by the second nodes and content of the objects represented by the second nodes;

wherein the server system is further configured to assign the names to the at least the second nodes according to the at least one of identifiers of the objects represented by the second nodes and content of the objects represented by the second nodes comprises using a logic learning model.

* * * * *